US009300916B1

(12) United States Patent
Breedvelt-Schouten et al.

(10) Patent No.: US 9,300,916 B1
(45) Date of Patent: Mar. 29, 2016

(54) NATURAL GAZES DURING ONLINE VIDEO CONVERSATIONS

(71) Applicant: International Business Machines Corporation, Armonk, NY (US)

(72) Inventors: Ilse M. Breedvelt-Schouten, Manotick (CA); Jana H. Jenkins, Raleigh, NC (US); Jeffrey A. Kusnitz, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/619,055

(22) Filed: Feb. 10, 2015

(51) Int. Cl.
*H04N 7/14* (2006.01)
*H04N 7/15* (2006.01)
*G06F 3/01* (2006.01)

(52) U.S. Cl.
CPC ............... *H04N 7/152* (2013.01); *G06F 3/017* (2013.01)

(58) Field of Classification Search
CPC ........................................................ H04N 7/14
USPC .......... 348/14.01, 14.03, 14.07, 14.08, 14.12, 348/14.16
See application file for complete search history.

(56) References Cited

U.S. PATENT DOCUMENTS

| | | | |
|---|---|---|---|
| 5,675,376 A | 10/1997 | Andersson et al. | |
| 6,806,898 B1 | 10/2004 | Toyama et al. | |
| 7,126,627 B1 | 10/2006 | Lewis et al. | |
| 8,670,019 B2 | 3/2014 | Byers | |
| 8,890,919 B2 | 11/2014 | Fussy | |
| 2007/0188597 A1* | 8/2007 | Kenoyer | H04N 7/147 348/14.08 |
| 2013/0222644 A1 | 8/2013 | Son et al. | |
| 2013/0271552 A1 | 10/2013 | Hillis et al. | |
| 2013/0271560 A1* | 10/2013 | Diao | H04N 12/1827 348/14.08 |
| 2014/0002586 A1 | 1/2014 | Nourbakhsh | |

FOREIGN PATENT DOCUMENTS

WO 2012057665 A1 5/2012
WO 2013127418 A1 9/2013

OTHER PUBLICATIONS

Anonymous Inventors, Auto-Correction of Images of a Participant Eyes in a Virtual Collaboration Session, Database: IP.COM, IP.COM No. IPCOM000226803D, Apr. 22, 2013.
Shah, 3D webcams will help PCs read human emotions, Intel says, http://www.networkworld.com/article/2173147/computers/3d-webcams-will-help-pcs-read-human-emotions--intel-says.html?null, Jan 6, 2014.
Ciaramello, Real-Time Face and Hand Detection for Videoconferencing on a Mobile Device, http://foulard.ece.cornell.edu/fmc3/Ciaramello/publications/papers/Ciaramello_VPQM2009_Web.pdf, Visual Communication Laboratory School of Electrical and Computer Engineering, Cornell University, Jan. 2009.
Gemmell, Gaze Awareness for Videoconferencing: A Software Approach, http://research.microsoft.com/en-us/um/people/larryz/gazeawareness.pdf, Oct.-Dec. 2000.

* cited by examiner

*Primary Examiner* — Olisa Anwah
(74) *Attorney, Agent, or Firm* — North Shore Patents, P.C.; Michele Liu Baillie

(57) ABSTRACT

A system of enhancing communication in a multi-participant video conference by tracking eye contact between participants, implemented by a computing processor, detects that a first participant is looking at a second participant on a first screen viewed by the first participant, where both are engaged in the multi-participant video conference. The system adjusts a first video representation of the first participant such that the first participant appears to look directly at the second participant on a second screen viewed by the second participant. The system adjusts the second video representation to look directly at the first participant to enhance communication between the first participant and the second participant by allowing the first participant and the second participant to look directly into each other's eyes during the multi-participant video conference.

19 Claims, 5 Drawing Sheets

NATURAL GAZES DURING ONLINE VIDEO CONVERSATIONS

BACKGROUND

Video conferencing allows participants to both see and hear each other as though the participants were in the same room. The cameras that capture the live video feed are the tools that allow the participants to see each other. Unfortunately, the cameras do not allow participants to experience looking into each other's eyes during the video conference in the same way that people naturally gaze into each other's eyes during a face to face conversation. This is because the screen itself is not the camera, and the angle at which the camera takes the video causes the participant to appear to be looking in a different direction. For example, a camera mounted at the top of a laptop causes the participant to appear to be looking down for the duration of the video conference. Thus, participants cannot see who each participant is looking at. Having participants look directly into their cameras is not a solution because every participant would appear to be looking at every other participant, and, further, participants would not be able to follow presentations presented on the screen if they are staring at their respective camera. There exists a need for video conferencing participants to experience looking at each other while each participant is focused on their respective screens, to enhance communication. There also exists a need for video conferencing participants to know who is looking at them, and who is, for example, paying attention, to the speaker, the presentation materials, or any other participant.

SUMMARY

According to an embodiment disclosed herein, in a method for enhancing communication in a multi-participant video conference by tracking eye contact between participants, implemented by a computing processor, when a first participant and a second participant are engaged in the multi-participant video conference, the processor detects that the first participant is looking at the second participant on a first screen viewed by the first participant. The processor adjusts a first video representation of the first participant on a second screen viewed by the second participant, where the first video representation of the first participant appears to look directly at the second participant.

In one aspect of embodiments disclosed herein, the processor adjusts a second video representation of the second participant on the first screen viewed by the first participant. The second video representation of the second participant indicates which participant, in the multi-participant video conference, the second participant is looking at.

In one aspect of embodiments disclosed herein, when the method adjusts the second video representation of the second participant on the first screen viewed by the first participant, the method adjusts the second video representation to look directly at the first participant to enhance communication between the first participant and the second participant by allowing the first participant and the second participant to look directly into each other's eyes during the multi-participant video conference.

In one aspect of embodiments disclosed herein, the method provides an indication, on the second screen, indicating to the second participant, that the first participant is looking at the second participant.

In one aspect of embodiments disclosed herein, the method provides an indication on the second screen, indicating to the second participant, that a plurality of the participants in the multi-participant video conference are looking at the second participant.

In one aspect of embodiments disclosed herein, the method provides, on the second screen, information associated with the first participant.

In one aspect of embodiments disclosed herein, when the method provides, on the second screen, information associated with the first participant, the method identifies the first participant using facial recognition techniques. The method provides, on the second screen, for the benefit of the second participant, the identity of the first participant.

In one aspect of embodiments disclosed herein, the method provides a timer to at least one of the first participant and the second participant, indicating how long the first participant looks at the second participant.

In one aspect of embodiments disclosed herein, when the method detects that the first participant is looking at the second participant on the first screen viewed by the first participant where the first participant and the second participant are engaged in the multi-participant video conference, the method determines, on the first screen viewed by the first participant, a location of a visual gaze of the first participant when viewing the multi-participant video conference, where at least one of the participants of the multi-participant video conference is rendered on the first screen. The method associates the location on the first screen with the second participant to determine that the first participant is looking at the second participant.

In one aspect of embodiments disclosed herein, the method provides an indication to the first participant of the location on the first screen where the first participant is looking.

In one aspect of embodiments disclosed herein, when the method detects that the first participant is looking at the second participant on the first screen viewed by the first participant, where the first participant and the second participant are engaged in the multi-participant video conference, the method determines that the second participant is comprised of a plurality of sub-participants. The method detects that the first participant is looking at one of the plurality of sub-participants. When the method adjusts the first video representation of the first participant on the second screen viewed by the second participant, the method adjusts the first video representation where the first video representation of the first participant appears to look directly at the one of the plurality of sub-participants.

System and computer program products corresponding to the above-summarized methods are also described and claimed herein.

DETAILED DESCRIPTION

Figure 1:
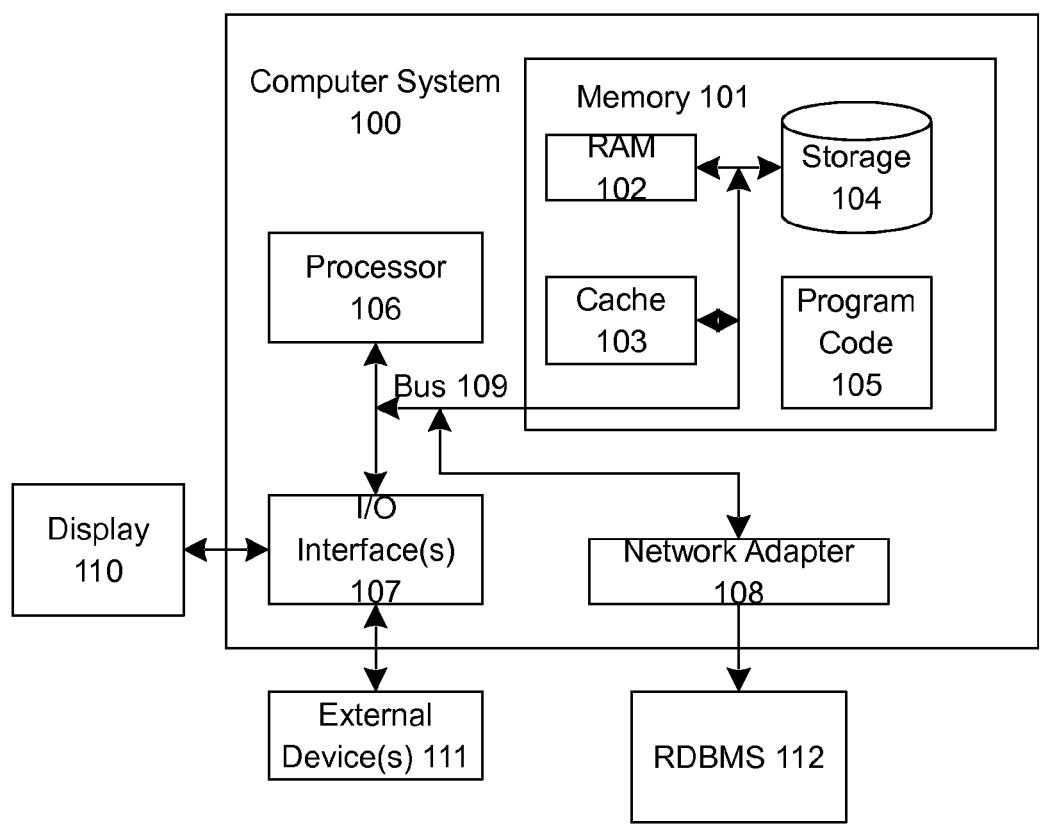
FIG. 1 illustrates an embodiment of a system for enhancing communication in a multi-participant video conference by tracking eye contact between participants, according to embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates a system for enhancing communication in a multi-participant video conference by tracking eye contact between participants according to embodiments of the present invention. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiment of the present invention when executed by the processor 106. The computer system 100 may also communicate with one or more external devices 111, such as a display 110, via I/O interfaces 107. The computer system 100 may communicate with one or more networks via network adapter 108. The computer system 100 may communicate with one or more databases 112 via network adapter 108.

Figure 2:
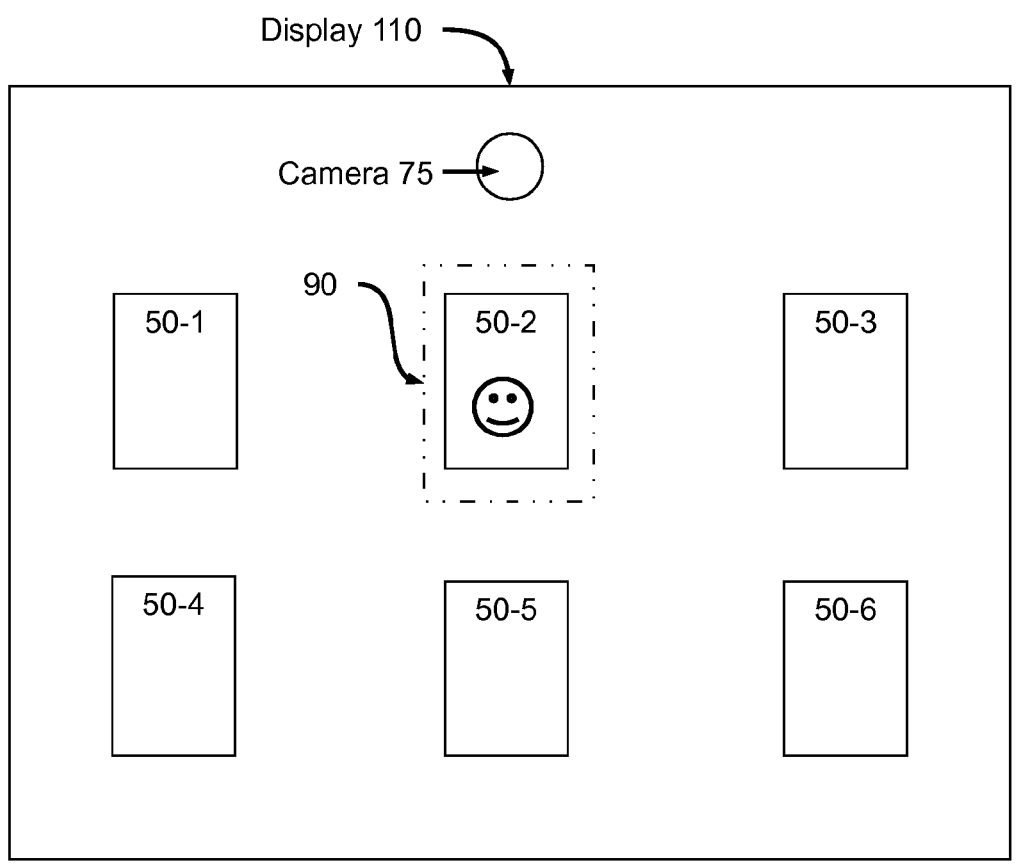
FIG. 2 illustrates an example embodiment of a multi-participant video conference with enhanced communication.

FIG. 2 illustrates an example embodiment of a multi-participant video conference with enhanced communication. Participants 50-1 through 50-6 are participating in a multi-participant video conference. A first participant (not shown) is viewing the multi-participant video conference on the display 110. In other words, the first participant is staring at the display 110, viewing the multi-participant video conference. The display 110 may be any type of screen, monitor, etc. on which a participant would view the video conference. The camera 75 captures video of the first participant, allowing the other participants to see the first participant on their respective displays. The method may execute on the computer system 100. In an example embodiment, the method may execute within the camera 75. The camera 75 may be located outside the screen. In this example, the first participant is staring at participant 50-2. The method, using eye-gaze direction detection, provides an indication 90 to the first participant where, on the display 110, the first participant is looking. In this example, participant 50-2 is looking at the first participant while the first participant is looking directly at participant 50-2. None of the other participants 50-1, and 50-3 through 50-6 are looking at the first participant.

Figure 3:
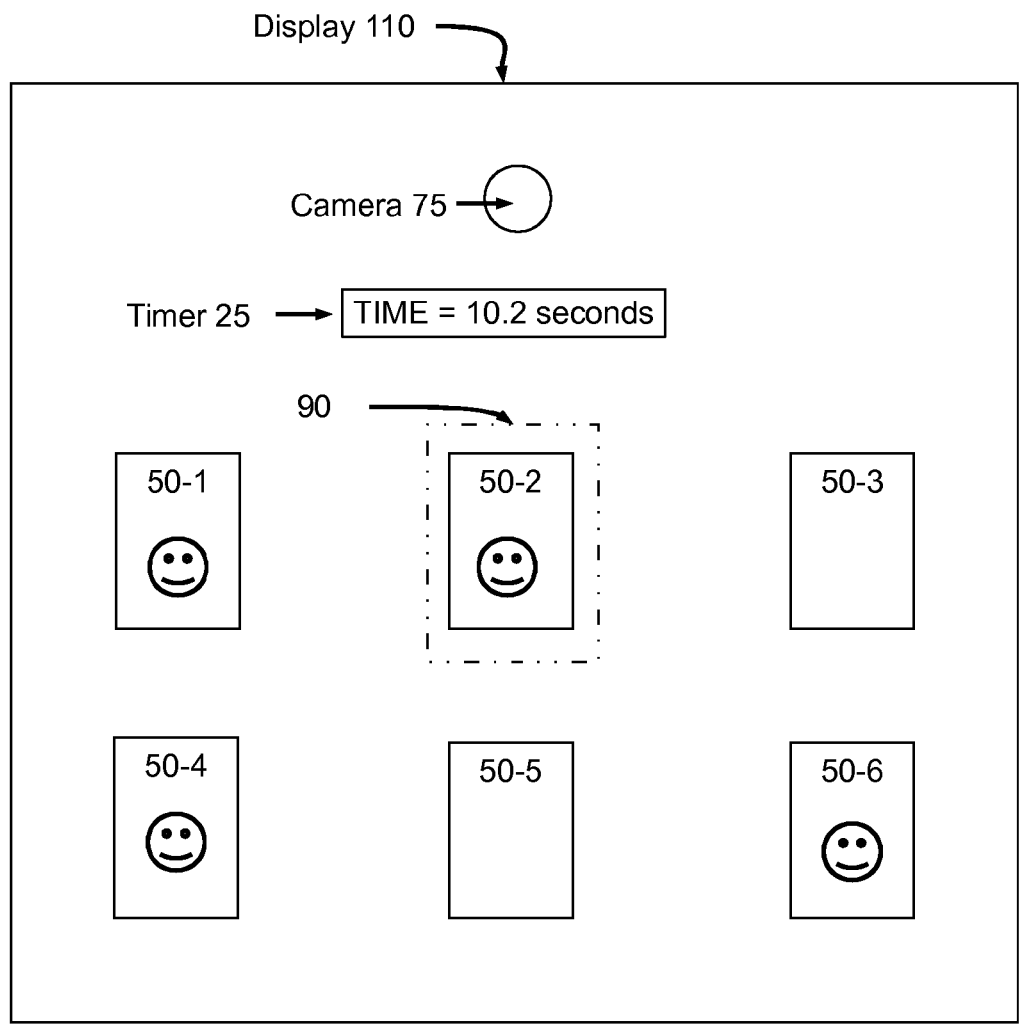
FIG. 3 illustrates an example embodiment of a multi-participant video conference with enhanced communication including a timer.

FIG. 3 illustrates an example embodiment of a multi-participant video conference with enhanced communication including a timer 25. Participants 50-1 through 50-6 are participating in a multi-participant video conference. A first participant (not shown) is viewing the multi-participant video conference on the display 110 (i.e., the first participant is staring at the display 110). The camera 75 allows the other participants to see the first participant on their respective displays. In this example, the first participant is staring at participant 50-2. The method, using eye-gaze direction detection, provides an indication 90 to the first participant where, on the display 110, the first participant is looking. The timer 25 indicates to the first participant how long the first participant has been staring at participant 50-2. In this example, participant 50-2 is looking at the first participant while the first participant is also looking directly at participant 50-2. In an example embodiment, a different timer (not shown) indicates to the first participant how long the second participant (i.e., participant 50-2) has been staring at the first participant. Participants 50-1, 50-4 and 50-6 are also looking at the first participant while participants 50-3 and 50-5 are not.

Figure 4:
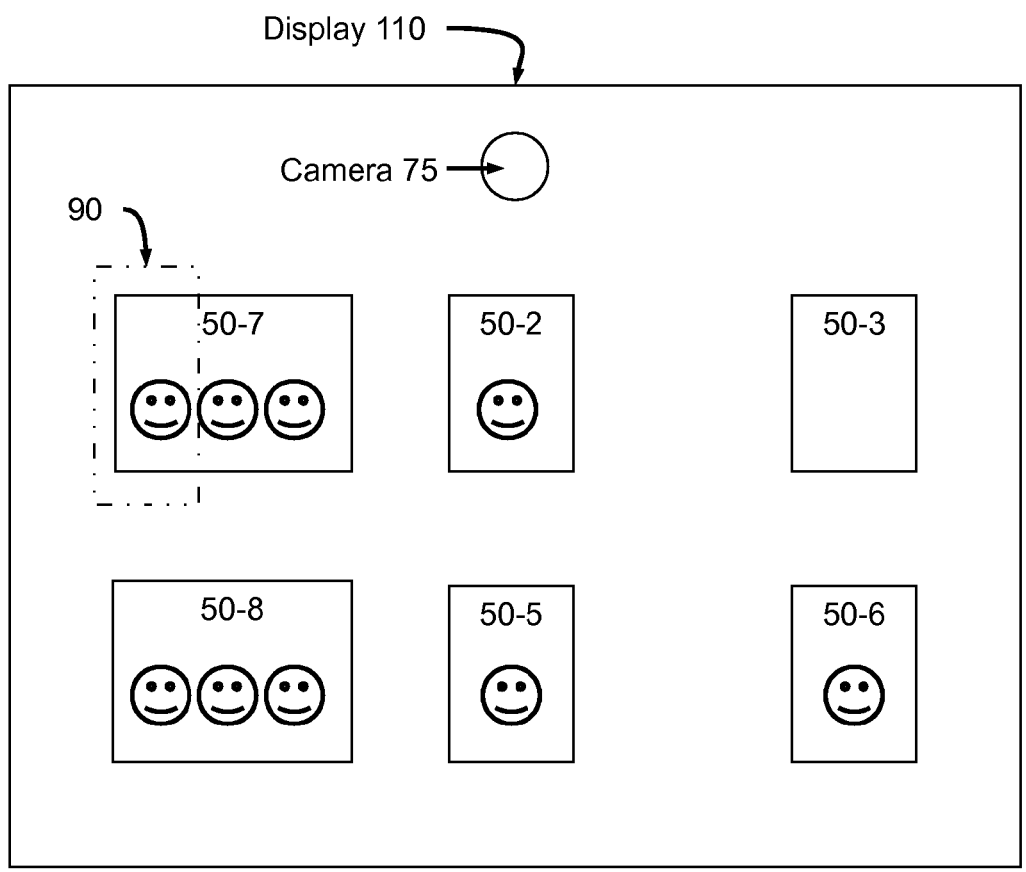
FIG. 4 illustrates an example embodiment of a multi-participant video conference with enhanced communication where some of the participants are comprised of sub-participants.

FIG. 4 illustrates an example embodiment of a multi-participant video conference with enhanced communication where some of the participants also have sub-participants. Participants 50-2, 50-3, 50-5, 50-6, 50-7 and 50-8 are participating in a multi-participant video conference. Participants 50-7 and 50-8 are each comprised of a plurality of sub-participants. A first participant (not shown) is viewing the multi-participant video conference on the display 110 (i.e., the first participant is staring at the display 110). The camera 75 allows the other participants to see the first participant on their respective displays. In this example, the first participant is staring at one of the sub-participants of participant 50-7 while the sub-participants of participant 50-7 are looking at the first participant. The method, using eye-gaze direction detection, provides an indication 90 to the first participant where, on the display 110, the first participant is looking. In this example, the indication 90 displays which of the sub-participants (in participant 50-7) the first participant is staring at. Participants 50-2, 50-5, 50-6 and 50-8 are also looking at the first participant while participants 50-3 are not.

Figure 5:
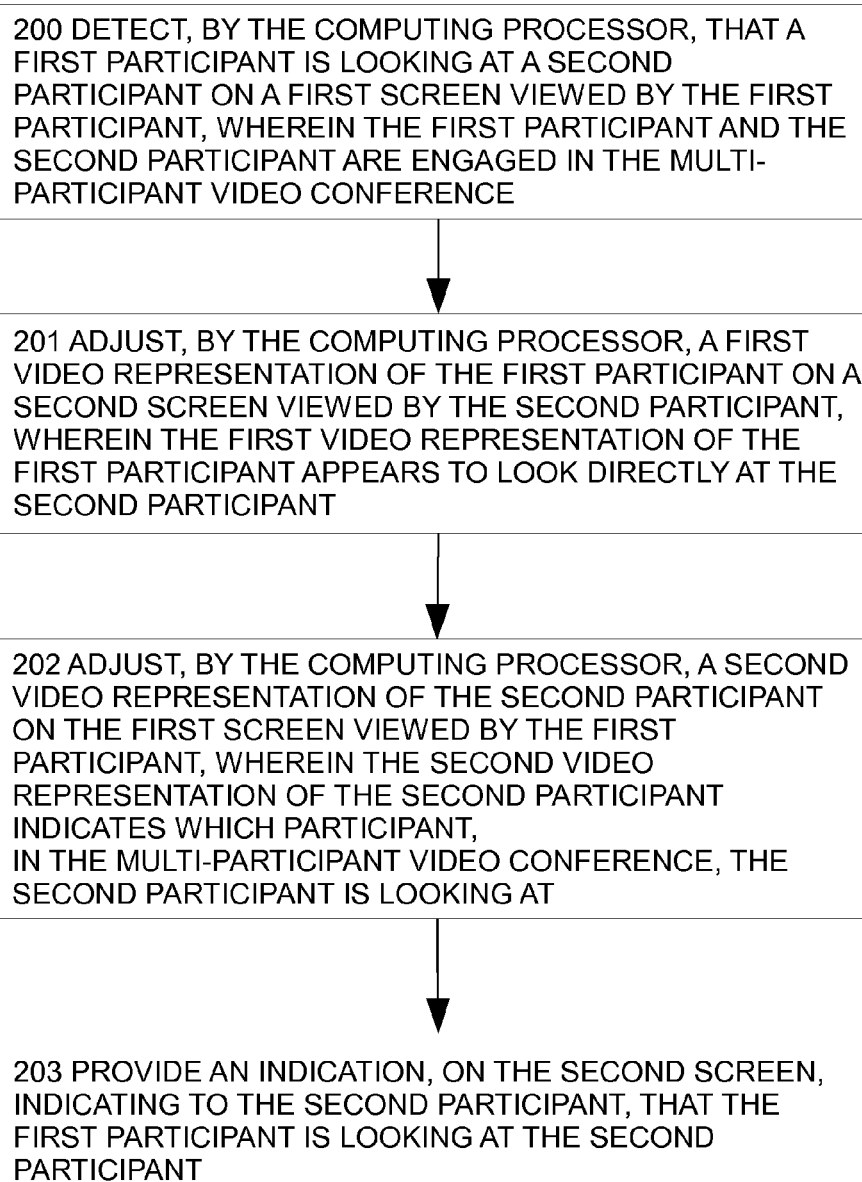
FIG. 5 is a flowchart illustrating an embodiment of a method for enhancing communication in a multi-participant video conference by tracking eye contact between participants, according to embodiments disclosed herein.

FIG. 5 illustrates an embodiment of a method for enhancing communication in a multi-participant video conference by tracking eye contact between participants. At 200, the method, via the computing processor 106, detects that a first participant is looking at a second participant on a first screen viewed by the first participant. The first participant and the second participant are engaged in the multi-participant video conference. In an example embodiment, the method, using eye-gaze direction detection, detects that the first participant is staring at their screen (i.e., display 110) at a location on the screen where a video representation of the second participant is rendered.

At 201, the method, via the computing processor 106, adjusts a first video representation of the first participant on a second screen viewed by the second participant, where the first video representation of the first participant appears to look directly at the second participant. As the second participant stares at their screen, the first participant appears to be staring directly at the second participant. Any number of techniques may be used for visual adjustment of eye direction of the first participant to adjust the visual gaze of the first participant so that the first video representation of the first participant appears to be staring directly at the second participant as the second participant stares at their screen.

At 202, the method, via the computing processor 106, adjusts a second video representation of the second participant on the first screen viewed by the first participant, where the second video representation of the second participant indicates which participant, in the multi-participant video conference, the second participant is looking at. The first participant can now see who the second participant is looking at, whether that is the first participant, or any other participant in the multi-participant video conference. Any number of techniques may be used for visual adjustment of eye direction of the second participant to adjust the visual gaze of the second participant so that the second video representation of the second participant appears to be staring at whichever participant the second participant is looking at as the second participant views the multi-participant video conference on their screen (i.e., the second screen). Other participants in the video conference can also see who the second participant is looking at.

In an example embodiment, when the method adjusts the second video representation of the second participant on the first screen viewed by the first participant, the method adjusts the second video representation to look directly at the first participant. This is to enhance communication between the first participant and the second participant by allowing the first participant and the second participant to look directly into each other's eyes during the multi-participant video conference, just as they would if they were conversing face to face. The first and second participants have the impression that they are looking each other in the eyes, which will benefit the natural communication channels that humans use. During presentations, the participant delivering the presentation (i.e., the presenter) will know if participants are looking at the presenter. Participants who ask a question will see whether they have the presenter's attention. Participants who are not looking at anyone may be viewed as not participating in the video conference/presentation.

At 203, the method provides an indication, on the second screen, indicating to the second participant, that the first participant is looking at the second participant. For example, the indication may be a visual indication (for example, highlighting, use of different colors for different participants, etc.) on the screen, or an audible indication. In an example embodiment, the second participant may be looking elsewhere, and the indication notifies the second participant that the first participant is looking at the second participant, and perhaps, wishes to speak with the second participant, direct a question to the second participant, etc.

In an example embodiment, the method provides an indication on the second screen, indicating to the second participant, that a plurality of the participants in the multi-participant video conference are looking at the second participant. The method provides an indication to the second participant which participants in the multi-participant video conference are looking at the second participant. For example, the indication may be a visual indication on the screen, or an audible indication. The method may provide a different audible indication for each of the participants so that the second participant knows which participants are looking at the second participant. This is helpful, for example, when the second participant is delivering a presentation. The second participant can see and/or hear, via this indication, which participants are engaged, and watching the presentation.

In an example embodiment, the method provides, on the second screen, information associated with the first participant. The information may include, for example, the first participant's name, background information, etc.

In an example embodiment, when the method provides, on the second screen, information associated with the first participant, the method identifies the first participant by using facial recognition techniques. The method then provides, on the second screen, for the benefit of the second participant, the identity of the first participant. Using facial recognition techniques, the method may provide to the second participant information regarding the identity of the first participant (who is looking at the second participant during the multi-participant video conference). The method may also correlate the identity of the first participant with any additional information that is associated with the first participant (such as company or department where the first participant is employed, etc.).

In an example embodiment, the method provides a timer to at least one of the first participant and the second participant, indicating how long the first participant looks at the second participant. The timer may inform the first participant how long the first participant is looking at the second participant. The timer may also inform the second participant how long that first participant is looking at the second participant. For example, during a presentation, it is helpful to know how long a presenter (or presentation) maintained the audience's interest. How long the participants looked at the presenter or the presenter's materials may indicate the audience's interest. It may also be helpful, from the presenter's point of view, to know how long the presenter focused on each of the participants, so as to maintain eye contact consistently with all the participants. The timer may provide analytics regarding presentations, usability studies for various applications that are presented on a screen, etc.

In an example embodiment, when the method detects that the first participant is looking at the second participant on the first screen viewed by the first participant, where the first participant and the second participant are engaged in the multi-participant video conference, the method determines, on the first screen viewed by the first participant, a location of a visual gaze of the first participant when viewing the multi-participant video conference, where at least one of the participants of the multi-participant video conference is rendered on the first screen. The method then associates the location on the first screen with the second participant to determine that the first participant is looking at the second participant. The method tracks the precise eye-movement over a screen with multiple faces of the other participants in the multi-participant video conference, and provides precise gaze direction for the specific face on the screen. In other words, the method determines where, on the first participant's screen, the first participant is looking, and then associates that location on the screen with where, on the first participant's screen, the video representation of the second participant is rendered, to determine that the first participant is looking at the second participant.

In an example embodiment, the method provides an indication to the first participant of the location on the first screen where the first participant is looking. The method provides to the first participant an indicator 90 to inform the first participant where on the first screen the first participant is looking, essentially providing the first participant with "Who am I looking at?" information. This is helpful if the first participant starts to lose focus during the multi-participant video conference, and the first participant's eyes start to drift while the first participant should be focused on the participant who is speaking. The method notifies the first participant where, on the first participant's screen, the first participant is looking during the multi-participant video conference. This becomes more helpful as the number of participants in the multi-participant video conference increases so that the first participant doesn't lose focus, and inadvertently stare at another participant when not intending to.

In an example embodiment, when the method detects that the first participant is looking at the second participant on the first screen viewed by the first participant, where the first participant and the second participant are engaged in the multi-participant video conference, the method determines that the second participant is comprised of a plurality of sub-participants. The participants in the multi-participant video conference may be individual participants, or each video conference participant may be comprised of a group of people who are sharing a video camera 75 and screen (such as a group of people sharing a conference room). The method detects that the first participant is looking at one of the plurality of sub-participants, for example, a group of people gathered on one side of a table.

In an example embodiment, when the method adjusts the first video representation of the first participant on the second screen viewed by the second participant, the method adjusts the first video representation so that the first video representation of the first participant appears to look directly at the one of the plurality of sub-participants. In an example embodiment, the method also provides an indication 90 to the first participant, indicating which of the plurality of sub-participants the first participant is looking at, as shown in FIG. 4.

The descriptions of the various embodiments of the present invention has been presented for purposes of illustration, but

What is claimed is:

1. A method of enhancing communication in a multi-participant video conference by tracking eye contact between participants, implemented by a computing processor, the method comprising:
   detecting, by the computing processor, that a first participant is looking at a second participant on a first screen viewed by the first participant, wherein the first participant and the second participant are engaged in the multi-participant video conference;
   adjusting, by the computing processor, a first video representation of the first participant on a second screen viewed by the second participant, wherein the first video representation of the first participant appears to look directly at the second participant; and
   providing a timer to at least one of the first participant and the second participant, indicating how long the first participant looks at the second participant.

2. The method of claim 1 further comprising:
   adjusting, by the computing processor, a second video representation of the second participant on the first screen viewed by the first participant, wherein the second video representation of the second participant indicates which participant, in the multi-participant video conference, the second participant is looking at.

3. The method of claim 2 wherein adjusting the second video representation of the second participant on the first screen viewed by the first participant comprises:
   adjusting the second video representation to look directly at the first participant to enhance communication between the first participant and the second participant by allowing the first participant and the second participant to look directly into each other's eyes during the multi-participant video conference.

4. The method of claim 1 further comprising:
   providing an indication, on the second screen, indicating to the second participant, that the first participant is looking at the second participant.

5. The method of claim 4 further comprising:
   providing an indication on the second screen, indicating to the second participant, that a plurality of the participants in the multi-participant video conference are looking at the second participant.

6. The method of claim 4 further comprising:
   providing, on the second screen, information associated with the first participant.

7. The method of claim 6 wherein providing, on the second screen, information associated with the first participant comprises:
   identifying the first participant using facial recognition techniques; and
   providing, on the second screen, for the benefit of the second participant, the identity of the first participant.

8. The method of claim 1 wherein detecting that the first participant is looking at the second participant on the first screen viewed by the first participant, wherein the first participant and the second participant are engaged in the multi-participant video conference comprises:
   determining, on the first screen viewed by the first participant, a location of a visual gaze of the first participant when viewing the multi-participant video conference, wherein at least one of the participants of the multi-participant video conference is rendered on the first screen; and
   associating the location on the first screen with the second participant to determine that the first participant is looking at the second participant.

9. The method of claim 8 further comprising:
   providing an indication to the first participant of the location on the first screen where the first participant is looking.

10. The method of claim 1 wherein detecting that the first participant is looking at the second participant on the first screen viewed by the first participant, wherein the first participant and the second participant are engaged in the multi-participant video conference comprises:
    determining that the second participant is comprised of a plurality of sub-participants; and
    detecting that the first participant is looking at one of the plurality of sub-participants; and
    wherein adjusting the first video representation of the first participant on the second screen viewed by the second participant comprises:
    adjusting the first video representation wherein the first video representation of the first participant appears to look directly at the one of the plurality of sub-participants.

11. A computer program product for enhancing communication in a multi-participant video conference by tracking eye contact between participants, the computer program product comprising:
    a non-transitory computer readable storage medium having computer readable program code embodied therewith, the program code causing a computing processor to:
        detect, by the computing processor, that a first participant is looking at a second participant on a first screen viewed by the first participant, wherein the first participant and the second participant are engaged in the multi-participant video conference;
        adjust, by the computing processor, a first video representation of the first participant on a second screen viewed by the second participant, wherein the first video representation of the first participant appears to look directly at the second participant; and
        providing a timer to at least one of the first participant and the second participant, indicating how long the first participant looks at the second participant.

12. The computer program product of claim 11 further configured to:
    adjust, by the computing processor, a second video representation of the second participant on the first screen viewed by the first participant, wherein the second video representation of the second participant indicates which participant, in the multi-participant video conference, the second participant is looking at.

13. The computer program product of claim 12 wherein the computer readable program code configured to adjust the second video representation of the second participant on the first screen viewed by the first participant is further configured to:
    adjust the second video representation to look directly at the first participant to enhance communication between the first participant and the second participant by allowing the first participant and the second participant to look directly into each other's eyes during the multi-participant video conference.

14. The computer program product of claim 11 further configured to:
provide an indication, on the second screen, indicating to the second participant, that the first participant is looking at the second participant.

15. The computer program product of claim 11 wherein the computer readable program code configured to detect that the first participant is looking at the second participant on the first screen viewed by the first participant, wherein the first participant and the second participant are engaged in the multi-participant video conference is further configured to:
determine, on the first screen viewed by the first participant, a location of a visual gaze of the first participant when viewing the multi-participant video conference, wherein at least one of the participants of the multi-participant video conference is rendered on the first screen; and
associate the location on the first screen with the second participant to determine that the first participant is looking at the second participant.

16. A system comprising:
a computing processor; and
a computer readable storage medium operationally coupled to the processor, the computer readable storage medium having computer readable program code embodied therewith to be executed by the computing processor, the computer readable program code configured to:
detect, by the computing processor, that a first participant is looking at a second participant on a first screen viewed by the first participant, wherein the first participant and the second participant are engaged in the multi-participant video conference;
adjust, by the computing processor, a first video representation of the first participant on a second screen viewed by the second participant, wherein the first video representation of the first participant appears to look directly at the second participant; and
providing a timer to at least one of the first participant and the second participant, indicating how long the first participant looks at the second participant.

17. The system of claim 16 further configured to:
adjust, by the computing processor, a second video representation of the second participant on the first screen viewed by the first participant, wherein the second video representation of the second participant indicates which participant, in the multi-participant video conference, the second participant is looking at.

18. The system of claim 17 wherein the computer readable program code configured to adjust the second video representation of the second participant on the first screen viewed by the first participant is further configured to:
adjust the second video representation to look directly at the first participant to enhance communication between the first participant and the second participant by allowing the first participant and the second participant to look directly into each other's eyes during the multi-participant video conference.

19. The system of claim 16 wherein the computer readable program code configured to detect that the first participant is looking at the second participant on the first screen viewed by the first participant, wherein the first participant and the second participant are engaged in the multi-participant video conference is further configured to:
determine, on the first screen viewed by the first participant, a location of a visual gaze of the first participant when viewing the multi-participant video conference, wherein at least one of the participants of the multi-participant video conference is rendered on the first screen; and
associate the location on the first screen with the second participant to determine that the first participant is looking at the second participant.

\* \* \* \* \*